July 7, 1959 W. H. WANNAMAKER, JR 2,894,207
ELECTRICAL POWER MEASURING APPARATUS
Filed July 1, 1954 2 Sheets-Sheet 1
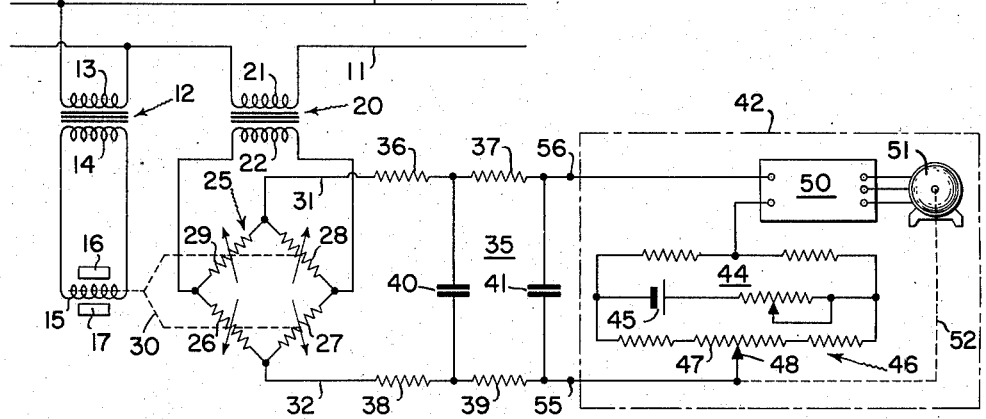
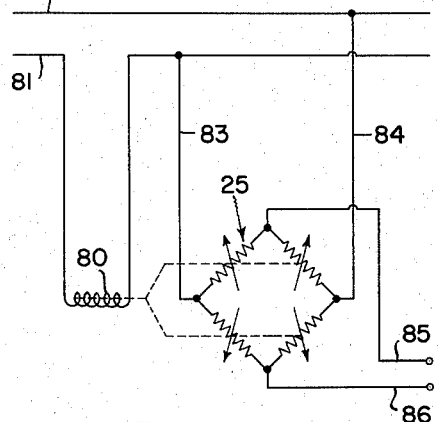
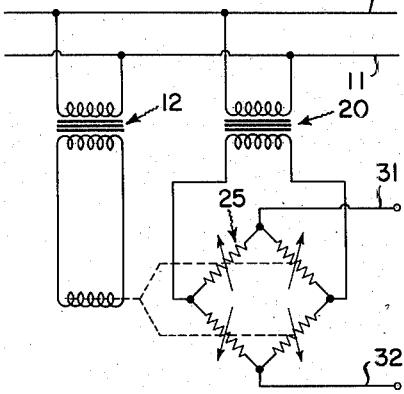
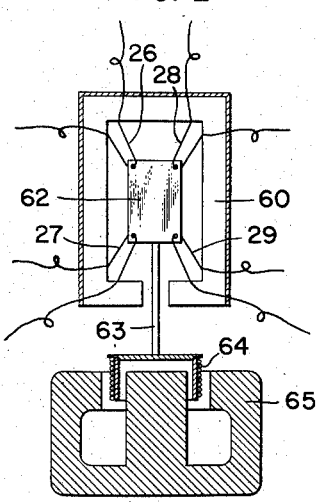
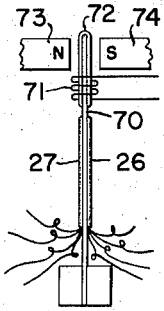
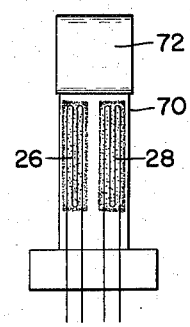
INVENTOR.
WILLIAM H. WANNAMAKER JR.
BY Arthur H. Swanson
ATTORNEY.

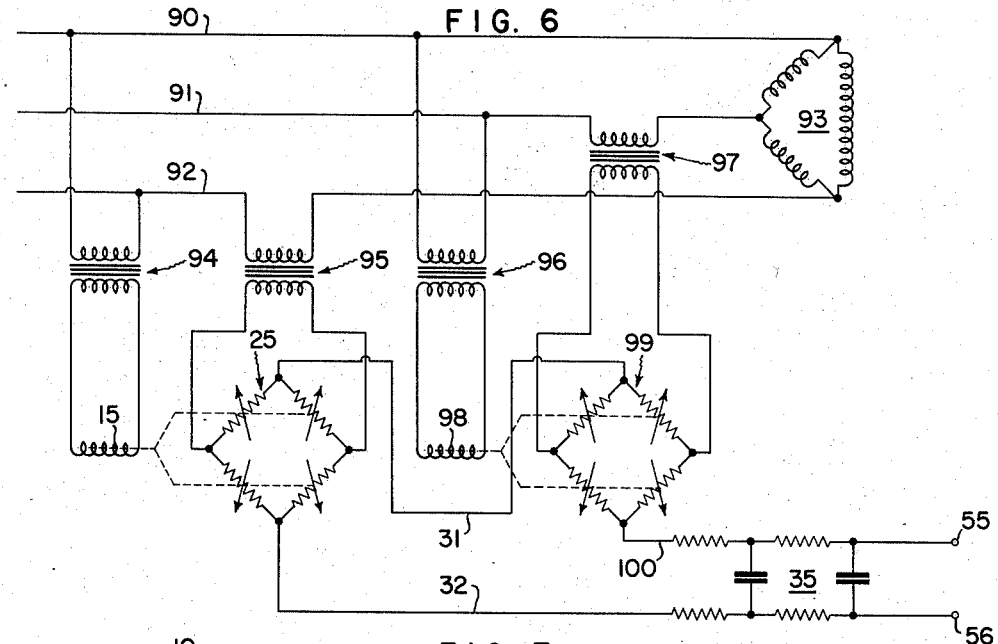

United States Patent Office 2,894,207
Patented July 7, 1959

2,894,207

ELECTRICAL POWER MEASURING APPARATUS

William H. Wannamaker, Jr., Philadelphia, Pa., assignor to Minneapolis-Honeywell Regulator Company, Minneapolis, Minn., a corporation of Delaware Application July 1, 1954, Serial No. 440,721

9 Claims. (Cl. 324—142)

The general object of the present invention is to provide an improved electrical measuring apparatus for measuring the electrical conditions of an electrical circuit. More specifically, the present invention is concerned with an electrical measuring apparatus which may be used to determine the power, voltage, and current conditions of an electrical circuit.

In measuring the magnitude of an electrical variable, an expedient frequently used to obtain high accuracy is to produce a unidirectional voltage signal having a magnitude proportional to the measured variable. The measured variable may be voltage, current, power, and the like. High accuracy of measurement is possible because the unidirectional voltage signal may be measured by highly accurate potentiometric measuring means. One of the problems in obtaining such a unidirectional signal is that, in power measurement, for example, the unidirectional power signal is in terms of the product of the electrical circuit voltage, current, and power factor. Heretofore, the apparatus capable of making such product measurements has been unduly complex, expensive, and has not been accurate. To be useful, the product producing apparatus must be simple, sensitive, and accurate over wide ranges of operation.

In accordance with the present invention, a very effective product producing apparatus has been devised by utilizing a resistance network wherein the balance of the network is varied in accordance with the magnitude of one input variable and the energization of the network is varied in accordance with the magnitude of a second variable. With such a network, the output electrical signal will be a signal proportional to the product of the two input variables.

It is accordingly a more specific object of the present invention to provide an improved electrical measuring apparatus which includes a product producing network whose balance is varied in accordance with the magnitude of one input variable and the energization of the network is varied in accordance with the magnitude of a second variable while the output of said network is in the form of a signal directly proportional to the product of said variables.

Another more specific object of the present invention is to provide an electrical measuring apparatus for measuring a variable from an electric circuit wherein said apparatus comprises a resistance network whose unbalance is varied in accordance with a first electrical condition of said circuit and said network is energized by a second electrical condition of said circuit.

Still another more specific object of the present invention is to provide an electrical power measuring apparatus including a product taking rectifying unit having as an input thereto an electromechanical signal proportional to the voltage of a power circuit and an energizing signal proportional to the magnitude of the current of said circuit.

A still further more specific object of the present invention is to provide an electric circuit variable measuring apparatus in the form of a product taking transducer having in its input two separate electrical signals and an output proportional to the product of said signals and wherein said output is connected to a potentiometric network having an electrical energizing source including a further electrical signal which may be variable in accordance with one of the first mentioned electrical signals.

The various features of novelty which characterize the invention are pointed out with particularity in the claims annexed to and forming a part of the specification. For a better understanding of the invention, its advantages, and specific objects attained with its use, reference should be had to the accompanying drawings and descriptive matter in which there is illustrated and described a preferred embodiment of the invention.

Of the drawings:

Fig. 1 shows a schematic arrangement of an electrical power measuring apparatus for an alternating current circuit;

Fig. 2 shows one form of resistance type rectifier used in the apparatus in Fig. 1;

Fig. 3 shows a further type of resistance rectifier which may be used in Fig. 1;

Fig. 4 shows a side view of the apparatus shown in Fig. 3;

Fig. 5 shows the principle of the apparatus applied to a direct current circuit;

Fig. 6 shows a poly-phase power measuring circuit incorporating the principles of Fig. 1;

Fig. 7 shows a further form of the apparatus using a potentiometric measuring circuit energized by an electrical signal derived from the power circuit; and Fig. 8 shows a modification of the electrical circuit of Fig. 7.

Referring first to Fig. 1, the numerals 10 and 11 represent electrical leads for an electrical circuit wherein it is desired to measure the power being supplied by that circuit. Connected across the lines 10 and 11 is a potential transformer 12 having a primary winding 13 and a secondary winding 14. The secondary winding 14 is connected to an energizing coil 15 of an electro-mechanical transducer which converts the electrical input signal supplied thereto into mechanical motion. Cooperating with the coil 15 are permanent magnet poles 16 and 17.

Connected in series in the line 11 is a current transformer 20 having a primary winding 21 and a secondary winding 22. Connected to be energized by the secondary winding 22 is a resistance network 25 which may be in the form of a Wheatstone bridge type wherein all of the elements thereof are variable. The resistance elements of the network are identified by the numerals 26, 27, 28, and 29. Connected to the output of the coil 15 is appropriate mechanism 30 for simultaneously varying the magnitudes of the resistances 26—29.

The output of the network 25 is on leads 31 and 32 and these leads are connected to a filter section 35 comprising series resistors 36, 37, 38, and 39 and shunting condensers 40 and 41. The output of the filter 35 connects to the input terminals of a suitable potentiometric measuring apparatus 42. This apparatus may take the form of the apparatus shown in the Walter P. Wills Patent 2,423,540, issued July 8, 1947. As shown, this apparatus comprises a potentiometric network 44 receiving its energization from a source 45 and an adjustable potentiometer 46, the latter having a slidewire resistor 47 and a slider 48 cooperating therewith.

For sensing the electrical unbalance present in the overall circuit, there is provided an amplifier 50 which is adapted to amplify the input signals and provide a suitable driving signal for a motor 51, the latter of which is connected by suitable means 52 to move the slider 48 over the potentiometer slidewire 47.

In considering the operation of Fig. 1, it should first be noted that the coil 15 is energized by an alternating current signal and this will cause the mechanical driving means 30 to be moved in a cyclic manner so as to vary the resistances 26 through 29 in accordance with the magnitude of the applied signal and at a rate which corresponds to the frequency of the applied signal. The mechanical driving means 30 is so associated with the resistors of the network 25 that resistor 26 and resistor 28 are adapted to be decreased in magnitude while the magnitude of the resistors 27 and 29 is increased. With such a balance variation taking place, the electrical balance of the network 25 will be reversing at a rate dependent upon the frequency of the applied signal. In the abscence of an applied voltage to the network 25, there will be no effective electrical signals on the output leads 31 and 32 even though the balance of the network 25 will be cyclically varying. By applying the electrical signal from the current transformer 20 to the input terminals of the network 25, there will be an output signal on the leads 31 and 32. This current signal will be proportional to the current signal flowing in the electrical circuit fed by lines 10 and 11.

The electrical signal of the current transformer will be an alternating current signal and will be of the same frequency as the signal driving the resistors 26 through 29. By proper connection of the two input signals, the phasing during one half cycle will produce a direct current pulse on the leads 31 and 32 of a magnitude which is proportional to the voltage signal applied to the coil 15 times the current signal applied to energize the network 25. On the subsequent half cycle, the unbalance of the bridge will be in a direction opposite to that of the first half cycle and the polarity of the applied current signal transformer 20 will also be reversed. As a result, a further direct current pulse of the same polarity will appear upon the terminals 31 and 32. These direct current pulses are effectively filtered by the filter 35 which produces on terminals 55 and 56 a smooth direct current or unidirectional signal with the ripple due to the rectification being eliminated from the signal. This direct current signal will then be proportional to the product of the input voltage and the current.

It should be noted that the magnitude of this output voltage will change if the phase of the current with respect to the voltage in the lines 10 and 11 changes. In other words, the electrical signal supplied by the secondary winding 22 is actually independent of the phase angle or power factor of the lines 10 and 11. However, due to the fact that the coil 15 is energized by the line voltage whose variations may be assumed to be the reference wave, any phase difference between the applied mechanical signal to the network 25 and the electrical signal to the transformer 20 will result in a decrease of the voltage appearing upon the terminals 55 and 56. Stated in another way, the only current which is effective in this apparatus is the in phase component of the power. This term is conventionally expressed as $I \cos \theta$.

The unidirectional signal of the terminals 55 and 56 is applied into the input of the instrument 42 where the voltage is compared with the voltage across the potentiometric network 44. If the voltages across the network 44 are not equal to the voltage across the input terminals 55 and 56, the amplifier 50 will detect the unbalance and drive the motor 51 until such time as the slider 48 is moved to a balance position. The position of the slider may be conveniently calibrated in terms of power being consumed in the electrical circuit including the leads 10 and 11.

From the foregoing it will be seen that the apparatus of Fig. 1 is a product taking type of apparatus having two separate input variables and an output signal in terms of a unidirectional signal proportional to the product of the two input variables. It will be readily apparent that the apparatus of Fig. 1 may be applied in many different ways to obtain the product of preselected input variables.

Referring to Fig. 2, there is shown one form of apparatus for varying the electrical balance of network 25. The apparatus there shown is of a conventional strain gauge type apparatus requiring an input force to produce change in the output of the resistors of the strain gauge. This apparatus comprises a support member 60 which has attached to the corners thereof the resistors 26, 27, 28, and 29. The resistors project from the corners of the support plate 62 which is a rectangular center piece. This plate is supported by the resistance elements 26 through 29. Extending from the plate 62 is a connecting rod 63 which projects outside of the housing of the apparatus and is adapted to have applied thereto a suitable force. The force producing member in the apparatus of Fig. 2 is an electrodynamic coil 64 which is carried by the rod 63 and is in cooperative relationship with respect to a permanent magnet assembly 65. The alternating current applied to the coil 64 may be the current derived from the potential transformer 12. It will also be readily apparent that the coil 64 may be energized by the current transformer 20. With a cyclic signal applied to the coil 64, the rod 63 will have a cyclically varying force applied thereto, which force is transmitted to the plate 62. The force on the plate 62 tends to stress the supporting resistors 26 through 29 so that the resistances will be cyclically varied in accordance with the applied signal.

The apparatus of Fig. 3 shows an alternative method of obtaining a cyclically varying mechanical stress of resistors in accordance with an applied alternating current signal, or a direct signal, if such is desired. Here, strain gauge elements 26 through 29 are fastened to a resilient cantilever or reed 70 of a conventional vibrator. Such a vibrator assembly may be of the type shown in the patent of Frederick W. Side, No. 2,423,524, issued July 8, 1947. In this apparatus, the reed 70 is adapted to be driven by coil 71 which surrounds the upper end 72 of the reed 70. This upper end 72 cooperates with the pole pieces of a suitable permanent magnet identified by the numerals 73 and 74. With an alternating current signal applied to the coil 71, the end 72 will be driven back and forth between the pole members 73 and 74 and in so moving, the reed 70 will be flexed in one direction or the other to strain the resistors 26 through 29 which are bonded thereto. It will be readily apparent that the coil 71 may be energized in any suitable manner by any suitable source of electrical energy.

In Fig. 5, there is shown the apparatus of Fig. 1 adapted for direct current power measurement. In this figure, a coil 80 is connected in series with the power line 81 and this coil will serve to produce an unbalancing force upon the resistors of the network 25. The energizing signal for the network 25, in this instance, is supplied by the voltage derived from the power lines 81 and 82 by way of leads 83 and 84. The output voltage of this network 25 will be the product of the current flowing in the coil 80 and the voltage across the lines 81 and 82 and there will appear upon the output leads 85 and 86 a signal proportional to that product. It will be readily apparent that the current and voltage connections can be reversed in the apparatus shown in Fig. 5 although it will be noted that from the practical standpoint, the current in the lines may be most expeditiously measured by means of a coil rather than by means of a calibrated shunt and an associated voltage measurement across the shunt. It is to be understood, however, that the apparatus is not to be considered limited to the form shown in the drawing of Fig. 5.

Referring now to Fig. 6, there is here shown a polyphase alternating current circuit wherein it is desired to measure the power to be consumed therein. This polyphase circuit is represented by the power lines 90, 91, and 92 which lead to a suitable power consuming device 93. In this apparatus, a first voltage signal is derived from the leads 90 and 92 by means of a potential transformer 94. An associated current signal is derived from the lead 92 by a current transformer 95.

The potential transformer 94 and the current transformer 95 are adapted to energize the product taking rectifier of the type shown in Fig. 1 which rectifier bears the same reference numerals as shown in Fig. 1. In addition, a further phase voltage is derived from the lines 90 and 91 by potential transformer 96. A further current signal is derived from the line 91 by current transformer 97. The potential transformer 96 is connected to drive a suitable driving coil 98 which is the same type of coil as coil 15. This coil in turn operates upon a further product taking rectifier bridge 99, the latter of which is energized by the current transformer 97.

In the operation of the apparatus of Fig. 6, each of the individual bridge networks 25 and 99 will have output direct current signals proportional to the power conditions representing the particular phases from which the signals are derived. These signals are added in series by a circuit that may be traced from the lead 100 through the bridge 99, lead 31, bridge 25, and lead 32 to the filter 35. The electrical signal on these two bridges equals the total power being consumed in the circuit fed by leads 90, 91, and 92. The output terminals 55 and 56 may be connected in any desirable manner to the potentiometric measuring apparatus, such as considered with respect to Fig. 1.

Fig. 7 shows a modification of the apparatus wherein it is desired to obtain a measure of the in phase current on the power lines 10 and 11. In this figure, the product taking rectifier section corresponds identically to that shown in Fig. 1 and corresponding components carry corresponding reference numerals. The modifications in this particular figure are in the potentiometric network in that here the potentiometric network 105 is adapted to have the voltage applied thereto by a bridge type rectifier 106 which is energized by the input power lines 10 and 11. The output of the rectifier 106 passes through a suitable filter 107 and supplies power to the network 105 by way of leads 108 and 109. Since the voltage applied across the potentiometric network 105 is derived from the line voltage on lines 10 and 11, the net effect of this voltage on the potentiometric network is to eliminate the voltage signal derived from the potential transformer 12 so that instead of the apparatus reading $EI \cos \theta$, the apparatus will now read only $I \cos \theta$. In other words, the amplifier 50 will sense any unbalance in the input and adjust the slider of the potentiometer network until the balance point is reached, said balance point being in terms of $I \cos \theta$.

The apparatus of Fig. 8 shows a further modification of the basic circuit of Fig. 7. In this apparatus, the product taking rectifier corresponds to that of Fig. 1 and Fig. 7 with the exception that instead of energizing the network 25 in accordance with a current signal, the circuit is energized in accordance with the voltage signal from the lines 10 and 11. As a result of this type of energization, there will appear upon the output leads 31 and 32 a direct current voltage proportional to the product of the two input voltages, or, in other words, $E^2$. When this circuit is combined with the circuit of Fig. 7 wherein the voltage on the potentiometric network 105 is derived from the line voltage, it will be readily apparent that the voltage applied to the input of the amplifier 50 at balance will be $E^2/E$ which is, in other words, E. In this form of the apparatus, the apparatus functions as a linear voltmeter.

It will be readily apparent that there are numerous possible modifications in the present apparatus which, under certain conditions, may appear desirable, particularly in the area of reversing the current and potential connections to the electrical circuit under examination.

While, in accordance with the provisions of the statutes, there has been illustrated and described the best forms of the embodiments of the invention known, it will be apparent to those skilled in the art that changes may be made in the form of the apparatus disclosed without departing from the spirit of the invention as set forth in the appended claims and that in certain cases, certain features of the invention may be used to advantage without a corresponding use of other features.

Having now described my invention, what I claim as new and desire to secure by Letters Patent is:

1. Apparatus for producing a unidirectional signal proportional to alternating current power in an electrical circuit comprising, a first connection to said circuit for providing a first signal representative of the current in said circuit, a second connection to said circuit for providing a second signal representative of the voltage in said circuit, an electro-mechanical device connected by one of said first and second connections to be energized by the corresponding one of said first and second signals, and a strain responsive resistance network having an input and an output adapted to have the resistors thereof alternately stressed and strained by said device in accordance with said corresponding one of said signals, and having its input connected by the other of said first and second connections to be energized by the other, corresponding one of said first and second signals such that said network will have an electrical signal on said output that varies in a series of unidirectional electrical pulses of an average magnitude proportional to the magnitude of said alternating current power.

2. Electrical circuit power measuring apparatus comprising, a balanceable strain responsive resistance network having input and output terminals, electro-mechanical means connected to said network for varying strain on said network and hence the electrical balance of said network in accordance with a signal proportional to the voltage of said circuit, and means for energizing said network in accordance with a signal proportional to the current of said circuit to produce at said network output a signal proportional to the power of said circuit.

3. Power measuring apparatus for an electrical circuit comprising, a balanceable electrical network having an input, an output, and network balance varying means comprising an electro-mechanical actuator connected to said network, means connecting one electrical component of said circuit to variably drive said actuator, and circuit means connecting another electrical component of said circuit to said input so that said network will have an output proportional to the product of said components of said electrical circuit.

4. Apparatus as defined in claim 3 wherein said circuit is a poly-phase circuit, wherein said electrical components are the voltage and current of a first phase of said circuit, wherein said output of said network is proportional to the power of said first phase, and wherein there are included a second balanceable electrical network having an input, an output, and network balance varying means comprising a second electro-mechanical actuator connected to said second network, means connecting a third electrical component of said circuit to variably drive said second actuator, circuit means connecting a fourth electrical component of said circuit to said input of said second network to cause the latter to produce an output proportional to the product of said third and fourth electrical components, said third and fourth electrical components being the voltage and current of a second phase of said circuit, whereby said output of said second network is proportional to the power of said second phase, measuring means, and means connecting the outputs of said networks in additive relationship to said measuring means, the latter being responsive to said outputs to provide a measure of the total power of said first and second phases of said circuit.

5. Apparatus as defined in claim 3 wherein there is included an adjustable potentiometric network having an output, means connecting one of said electrical components to effectively energize said potentiometric network, whereby the latter produces in its said output a balancing signal dependent in value upon the adjustment of said potentiometric network, means interconnecting said outputs of said potentiometric network and said electrical network to oppose said balancing signal to said output of said electrical network, and means responsive to a difference between the last mentioned signal and output for adjusting said potentiometric network and hence said balancing signal to reduce said difference.

6. An alternating current electrical circuit power measuring apparatus comprising, a strain type resistance network, electro-mechanical means arranged for connection to said circuit to be energized by an alternating voltage signal representative of the voltage of said circuit, means connecting said electro-mechanical means to mechanically strain said resistance network to vary the balance thereof in accordance with said signal, means arranged for connecting said circuit to said resistance network to energize said resistance network in accordance with a second alternating voltage signal representative of the current in said circuit, said alternating signals having the same frequency, whereby said resistance network produces a unidirectional voltage output representative of the power in said circuit, and a unidirectional signal measuring means connected to said network and responsive to said output thereof.

7. Apparatus as defined in claim 6 wherein said electromechanical means comprises an electro-dynamic coil and a cooperating permanent magnet.

8. Apparatus as defined in claim 6 wherein said electromechanical means is a synchronously driven blade having said strain network formed on the sides thereof.

9. Apparatus as defined in claim 6 wherein said second alternating voltage signal is the product of the current in said circuit and the cosine of the phase angle between the current and the voltage of said circuit.

References Cited in the file of this patent
UNITED STATES PATENTS

| | | |
|---|---|---|
| 2,169,116 | Thompson | Aug. 8, 1939 |
| 2,228,655 | Downing et al. | Jan. 14, 1941 |
| 2,282,396 | Cravath | May 12, 1942 |
| 2,289,961 | Hancock | July 14, 1942 |
| 2,492,556 | Gruchy | Dec. 27, 1949 |
| 2,551,291 | Rich | May 1, 1951 |
| 2,613,536 | Jakosky | Oct. 14, 1952 |
| 2,704,452 | Federn | Mar. 22, 1955 |